Patented July 17, 1928.

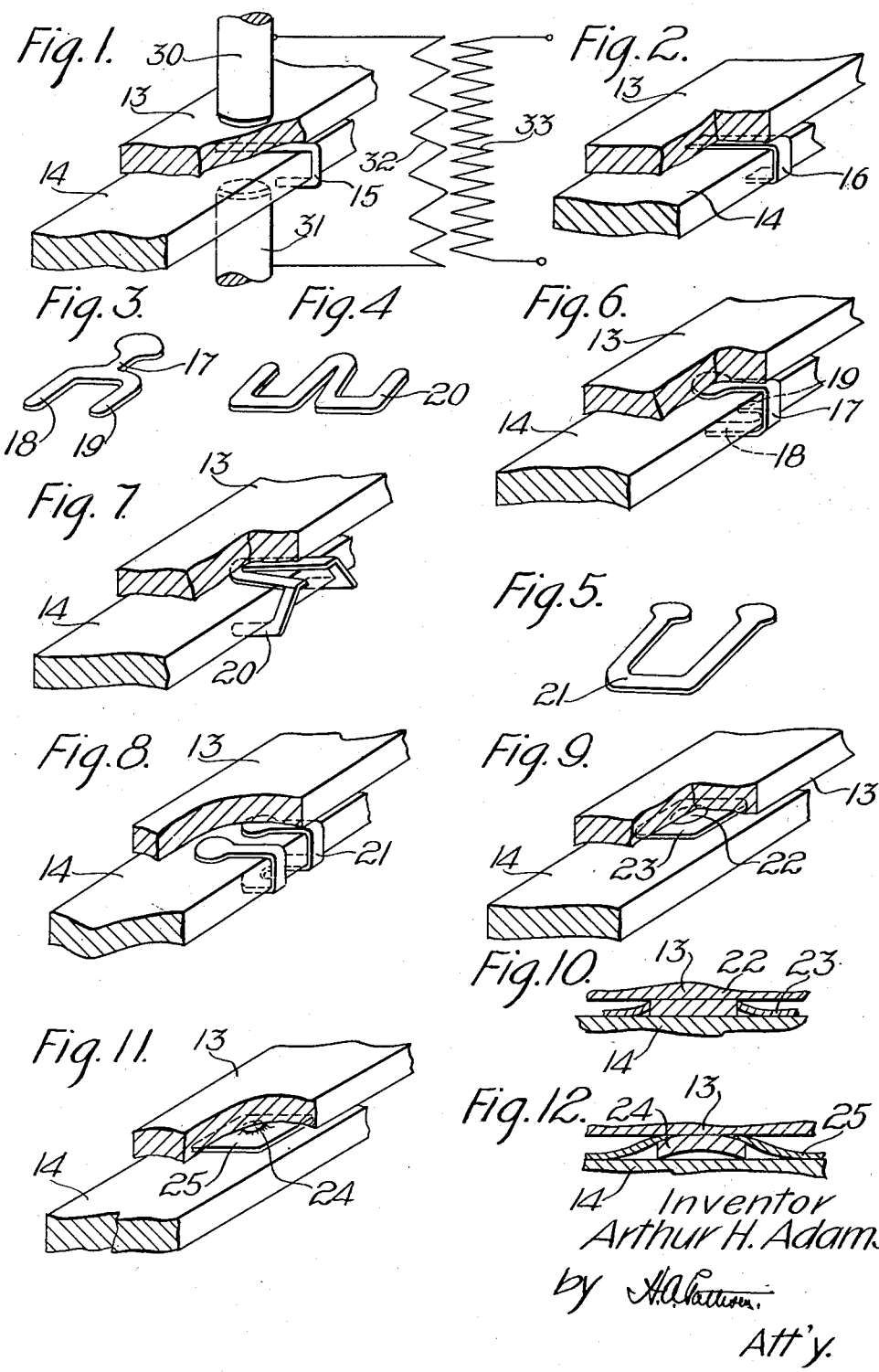

1,677,161

UNITED STATES PATENT OFFICE.

ARTHUR HERMAN ADAMS, OF LA GRANGE, ILLINOIS, ASSIGNOR TO WESTERN ELECTRIC COMPANY, INCORPORATED, OF NEW YORK, N. Y., A CORPORATION OF NEW YORK.

METHOD OF AND DEVICE FOR ELECTRIC WELDING.

Application filed May 25, 1925. Serial No. 32,612.

This invention relates to methods of and devices for welding parts, and more particularly to methods of and devices for electrically welding parts in localized areas.

In the electrical welding of parts presenting surfaces of comparatively large areas, it has been the practice in some instances to limit the weld to a restricted portion or so-called spot only sufficient in area to rigidly and permanently unite the parts. When the parts are of thin or light material, one or both of them are sometimes preliminarily embossed or otherwise formed so that when the parts are placed in position to be welded the current and pressures are localized by the formations and the parts are welded together at areas enclosing these formations. When the parts are of comparatively heavy material and difficult of formation, it has been proposed to accomplish a similar result by interposing between the surfaces to be welded, a material in finely divided form or in the form of pellets, buttons or strips, the latter form being positioned in alignment with the edge of one surface. In all of the forms it has been proposed to previously secure them in position upon one of the parts by projections thereof engaging apertures in the part, preliminarily welding them to the part or, in the welding of parts of dissimilar materials, by forming portions thereof around the edge of one part. The use of the small intermediate member permits the use of large flat surfaced electrodes avoiding the possibility of marring the surfaces of the parts during the welding which marring might be occasioned by the use of pointed electrodes.

The objects of the invention are to provide a simplified, efficient and economical method of and a simple and readily attachable device for electrically welding parts whereby the location of the welded areas may be readily and quickly predetermined without previous preparation of the parts.

In order to attain these objects in accordance with the main features of the invention a strand or strip member which may be of a metal similar in character to that of the parts to be welded, is preliminarily formed around the edge of and thereby clamped to a plate or sheet and extending inwardly from the edge. If in a strip form, the member may also terminate in a single or in a plurality of spaced enlarged portions to predetermine the location of the welds. In a modified form a pellet or button may be secured to the part by a strip of adhesively coated combustible material having an aperture exposing the exterior surface of the pellet. In all forms the attached member serves as a pressure and current localizing means when interposed between the parts during the welding operation.

Other advantages and features will become more apparent in the following description and accompanying drawing showing different forms of the invention, in which Fig. 1 is a perspective view of a wire clip shown in position as a pressure and current localizer between two plates to be welded, one of the plates being partially broken away, the plates being interposed between two electrodes connected with an electrical circuit;

Fig. 2 is a similar view showing a metal strip used as a localizing medium and ready to be interposed between the electrodes shown in Fig. 1;

Figs. 3, 4, and 5 are views of other forms of localizing devices embodying features of the invention;

Figs. 6, 7, and 8, respectively, are perspective views thereof showing these forms in position between two plates to be welded, one of the plates being partially broken away, the electrodes and the associated circuit being omitted;

Fig. 9 is a perspective view showing a localizing member in the form of a pellet held in welding position by a strip of combustible material adhesively secured to one of two plates and retaining the pellet in an aperture thereof;

Fig. 10 is an enlarged vertical section thereof;

Fig. 11 is a modification of the arrangement shown in Fig. 9, wherein the pellet is cup shaped, and Fig. 12 is an enlarged vertical section thereof.

Referring to the drawings in which like reference numerals designate like parts throughout the several views, two metal plates 13 and 14 are shown in Fig. 1 ready for welding, a wire clip 15 which may be formed in any suitable manner of metal similar to or differing from that of which the parts are composed having been securely clamped around the edge of the plate 14 and the plates 13 and 14 thereafter assembled as shown. The parts may then be placed between an upper electrode 30 and a lower electrode 31, as shown in Fig. 1, both of which may have large flat contacting areas. The electrodes may be connected with any suitable welding circuit such as that shown wherein they are connected to a secondary coil 32 of a transformer having a primary coil 33 connected with any suitable source of electric current (not shown). Pressure may then be applied in any suitable manner to the electrodes 30 and 31. The clip 15 presenting line contacts to the plates 13 and 14 localizes the pressure as well as the current passing between the plates causing the metals of the plates and the clip to fuse quickly and form a weld in a localized area extending to each side from the line contacts. Protruding ends of the wire clip may be trimmed off after the welding operation is completed. As shown in Fig. 2 a strip of metal 16 instead of the wire clip may be clamped around the part 14 where a larger welded area is desired. In case it is desired to produce a welded portion of appreciable area at a point removed from the edges of the plates a member 17 as shown in Fig. 3 may be employed. The member 17 may be composed of thin sheet metal one end being provided with a substantially round flat portion and bifurcated at the other end into portions 18 and 19. The member 17 may be clamped around the edge of the plate 14 as shown in Fig. 6. The lower electrode 31 may be applied to the under surface of the plate 14 between the ends 18 and 19 and these ends may be of sufficient length so as to provide a large gripping area to securely hold the member in place. When larger contact areas and separated clamping points are desired a member 20 shaped as shown in Fig. 4 may be employed. Such a member may be formed and clamped in position as shown in Fig. 7. If it is desirable to provide separated welded portions of appreciable area at points removed from the edges of the plates a member 21 as shown in Fig. 5 may be particularly useful. The member 21 is substantially U-shaped terminating in substantially round flat portions for determining the location of the welds and may be formed around the edge of the plate 14 as shown in Fig. 8. In all of the foregoing cases the parts may be assembled with the localizing members therebetween, inserted between the electrodes 30 and 31, and welded as described in connection with the wire clip 14 shown in Fig. 1.

In some cases, especially where the welds are to be located at a considerable distance from the edge it is desirable to attach the localizing member independently of the edge as well as eliminate the necessity of removing the excess portions of the members after the completion of the weld. The devices and arrangements shown in Figs. 9 and 12 inclusive are particularly adapted for this purpose. In the arrangement shown in Figs. 9 and 10 a metal pellet 22 is positioned within an aperture in a sheet or strip 23 of paper or other combustible material attached to the pellet and the plate 14 by any suitable adhesive. The plates thus prepared may then be interposed between the electrodes 30 and 31 and welded in a manner similar to that hereinbefore described. The modification of this arrangement shown in Figs. 11 and 12 employs a cupped pellet 24 and a sheet or strip 25 which extends partially over the upper surface of the pellet. The concave surface of the pellet 24 limits the contact between the pellet and the plate 14 to a line corresponding with periphery of the pellet. During the welding operation, the combustible strip 23 or 25 is consumed thus eliminating the necessity of trimming excess portions of the localizing members after the completion of the operation.

Although specific embodiments of the invention are illustrated and described, it is evident that the invention may take a variety of forms and it is to be understood that it is limited only by the scope of the appended claims.

What is claimed is:

1. In a device for welding two parts, a current localizing member adapted to be placed between the parts to be welded, and a member for attaching the localizing member to one of said parts, said attaching member having a perforation therein to permit contact between the localizing member and one of the parts.

2. A current localizing means for use in the spot welding of two parts comprising fusible and combustible portions, and means for attaching the combustible portion to one of the parts to be welded.

3. A current localizing device for use in the welding of metal parts, comprising a conducting member, a carrier for holding the conducting member, and means for securing the carrier to one of the parts to be united.

4. A current localizing device for use in the welding of metal parts, comprising a metal insert adapted to be placed between the parts, a combustible carrier for holding the insert, and means for securing the carrier to one of the parts to be united.

5. A current localizing device for use in the spot welding of metal parts, comprising a conducting insert, a combustible carrier having an opening therein for retaining the insert, and means for securing the carrier and the retained insert to one of the parts to be united.

In witness whereof, I hereunto subscribe my name this 15th day of May A. D., 1925.

ARTHUR HERMAN ADAMS.